(12) United States Patent
Jo et al.

(10) Patent No.: US 11,563,210 B2
(45) Date of Patent: Jan. 24, 2023

(54) SULFIDE-BASED ALL-SOLID-STATE BATTERY INCLUDING POSITIVE ELECTRODE ACTIVE MATERIAL COATED WITH LITHIUM NIOBATE PRECURSOR AND METHOD OF MANUFACTURING THE SAME

(71) Applicants: LG Chem, Ltd., Seoul (KR); The Regents of the University of California, Oakland, CA (US)

(72) Inventors: Chi Ho Jo, Daejeon (KR); Wang Mo Jung, Daejeon (KR); Hye Seung Chung, Seoul (KR); Hyuk In Moon, Gwangju (KR); Ying Shirley Meng, San Diego, CA (US)

(73) Assignees: The Regents of the University of California, Oakland, CA (US); LG Energy Solution, Ltd.

( * ) Notice: Subject to any disclaimer, the term of this patent is extended or adjusted under 35 U.S.C. 154(b) by 140 days.

(21) Appl. No.: 16/992,274

(22) Filed: Aug. 13, 2020

(65) Prior Publication Data
US 2022/0052322 A1   Feb. 17, 2022

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0402* (2013.01); *H01M 4/525* (2013.01); *H01M 4/62* (2013.01); *H01M 10/0562* (2013.01); *H01M 2004/028* (2013.01); *H01M 2300/0068* (2013.01)

(58) Field of Classification Search
None
See application file for complete search history.

(56) References Cited

U.S. PATENT DOCUMENTS

2009/0081554 A1   3/2009  Takada et al.
2010/0273056 A1   10/2010 Kanda et al.
(Continued)

FOREIGN PATENT DOCUMENTS

CN   102969497 A     3/2013
EP   3 089 242    *  11/2016
(Continued)

OTHER PUBLICATIONS

Narumi Ohta et al., "LiNbO.sub.3-coated LiCoO.sub.2 as cathode material for all solid-state lithium secondary batteries", Electrochemistry Communications 9, (2007), 1486-1490.*
(Continued)

*Primary Examiner* — Laura Weiner
(74) *Attorney, Agent, or Firm* — Lerner, David, Littenberg, Krumholz & Mentlik, LLP

(57) ABSTRACT

Disclosed herein are a sulfide-based all-solid-state battery and a method of manufacturing the same, wherein the sulfide-based all-solid-state battery includes a positive electrode active material coated with a lithium niobate precursor, which is manufactured by a polyol process having low production cost, such that it improves safety and increases capacity of the sulfide-based all-solid-state battery.

2 Claims, 9 Drawing Sheets

(51) Int. Cl.
*H01M 4/525* (2010.01)
*H01M 4/62* (2006.01)
*H01M 10/0562* (2010.01)
*H01M 4/02* (2006.01)

(56) References Cited

U.S. PATENT DOCUMENTS

| | | | |
|---|---|---|---|
| 2013/0209890 A1* | 8/2013 | Nagatomi | H01M 4/485 |
| | | | 429/231.5 |
| 2016/0315324 A1 | 10/2016 | Miki et al. | |
| 2017/0155132 A1 | 6/2017 | Kong et al. | |
| 2019/0372102 A1 | 12/2019 | Miki | |
| 2020/0075956 A1 | 3/2020 | Sugiura et al. | |
| 2022/0123315 A1 | 4/2022 | Sugiura et al. | |

FOREIGN PATENT DOCUMENTS

| | | |
|---|---|---|
| JP | 4982866 B2 | 7/2012 |
| JP | 2018067474 A | 4/2018 |
| JP | 2020035607 A | 3/2020 |
| KR | 20100075972 A | 7/2010 |
| KR | 20160127639 A | 11/2016 |
| KR | 20170063141 A | 6/2017 |
| KR | 20190135928 A | 12/2019 |

OTHER PUBLICATIONS

International Search Report for Application No. PCT/KR2021/010672 dated Nov. 19, 2021, pp. 1-4.

Yerlikaya, C. et al., "Size-controllable synthesis of lithium niobate nanocrystals using modified Pechini polymeric precursor method," Journal of Thermal Analysis Calorimetry, Feb. 2016, pp. 17-22, vol. 125.

* cited by examiner

[FIG. 1]
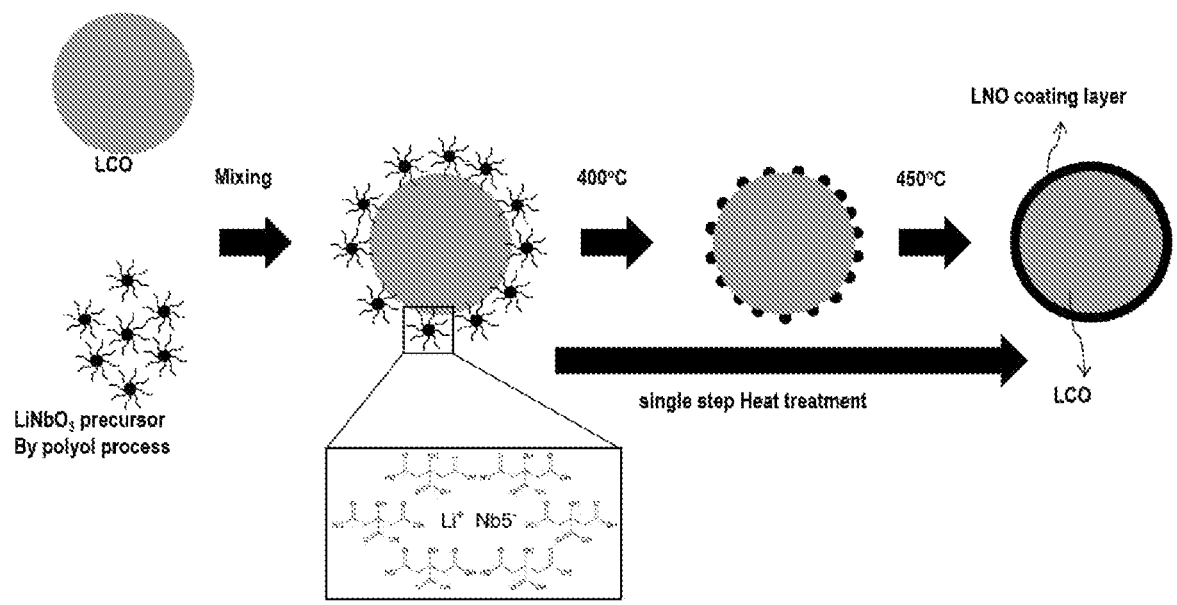

[FIG. 2]
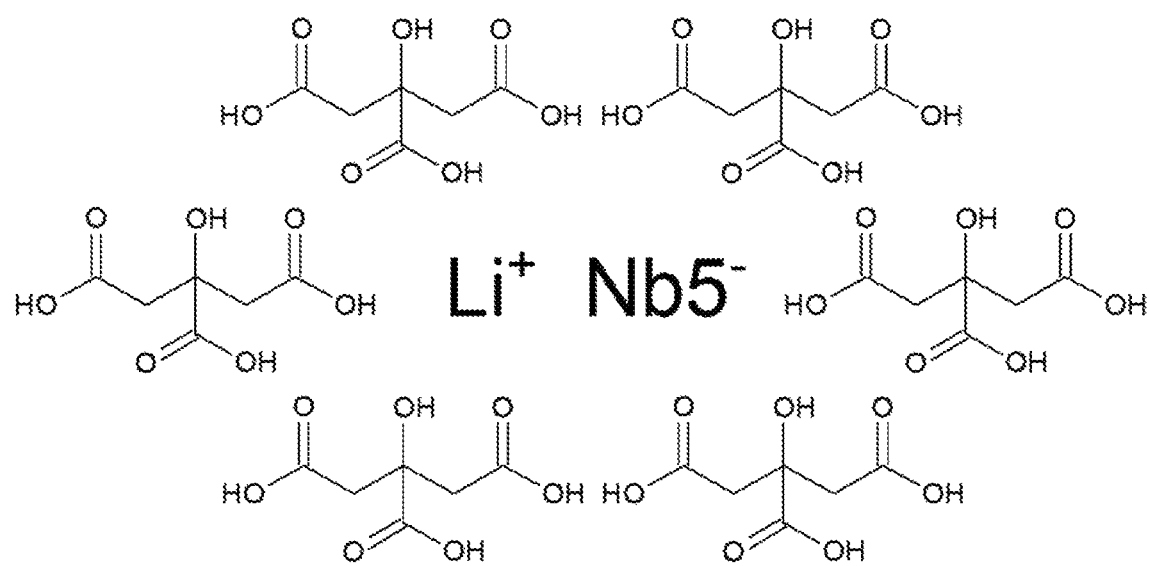

[FIG. 3]
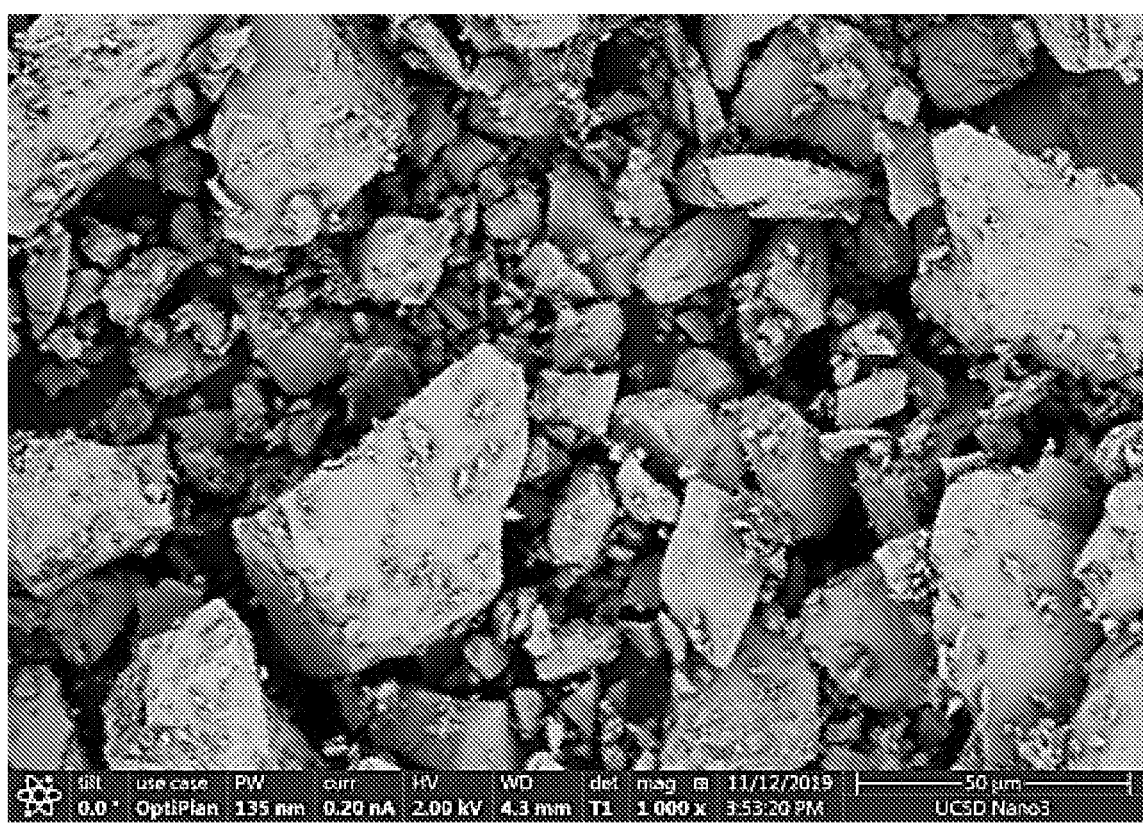

【FIG. 4】
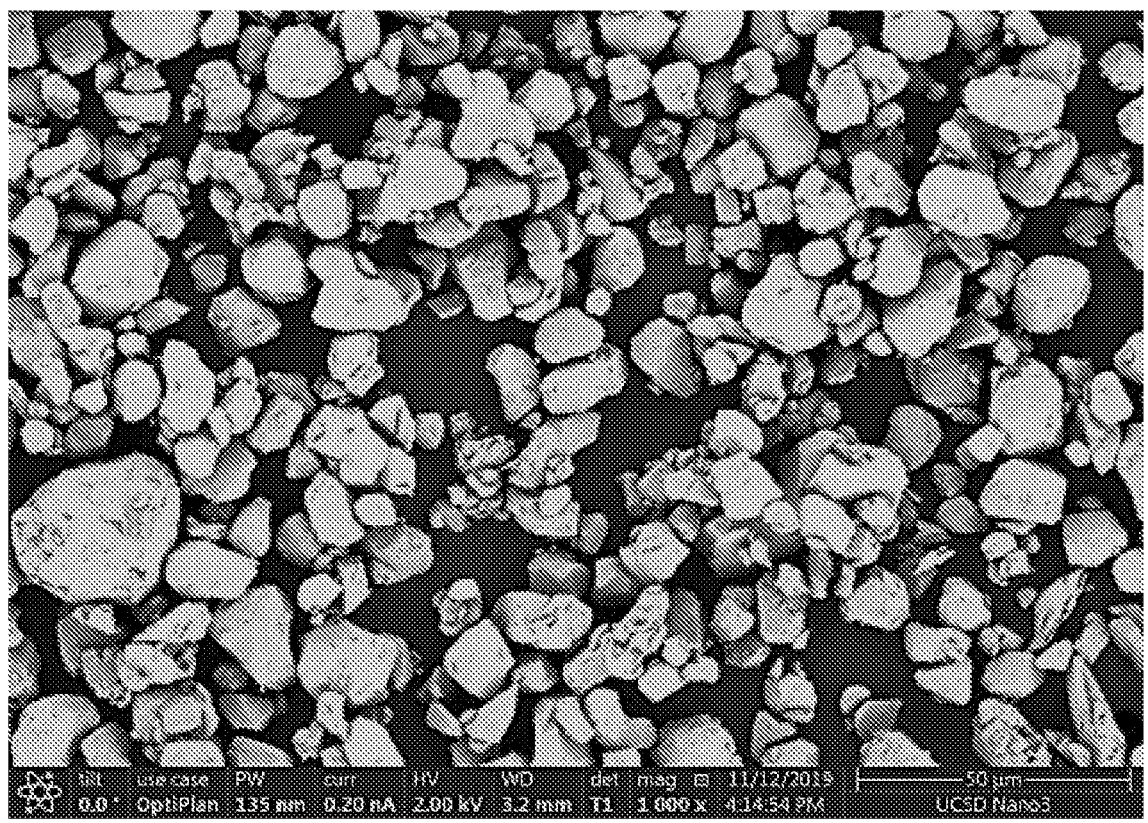

[FIG. 5]
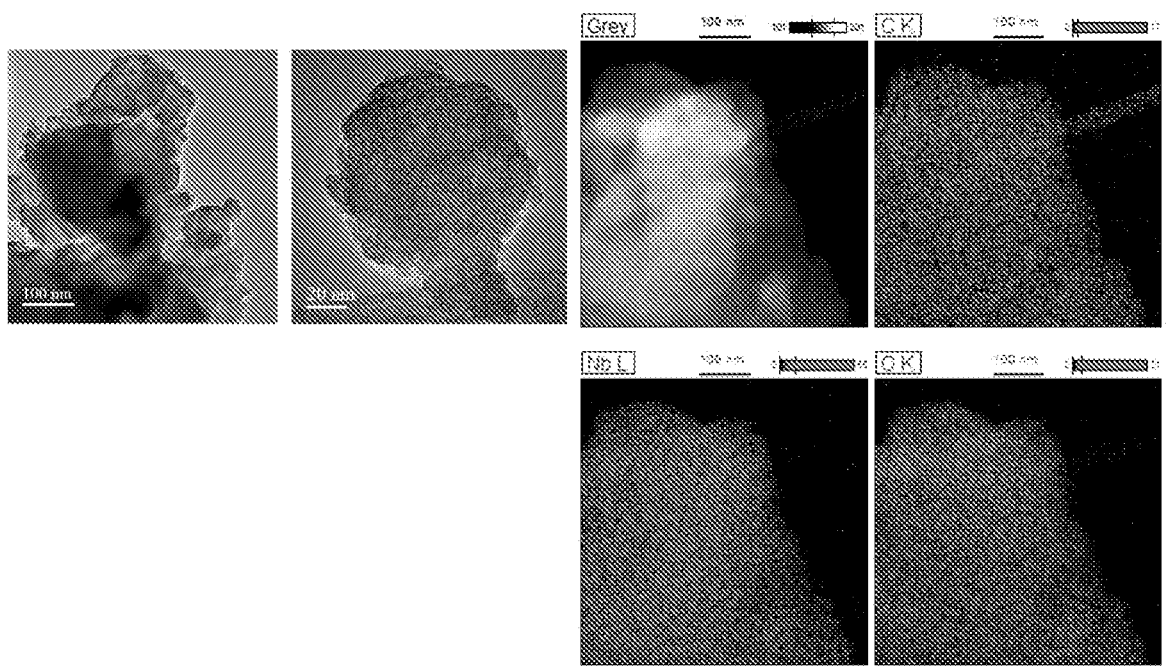

[FIG. 6]
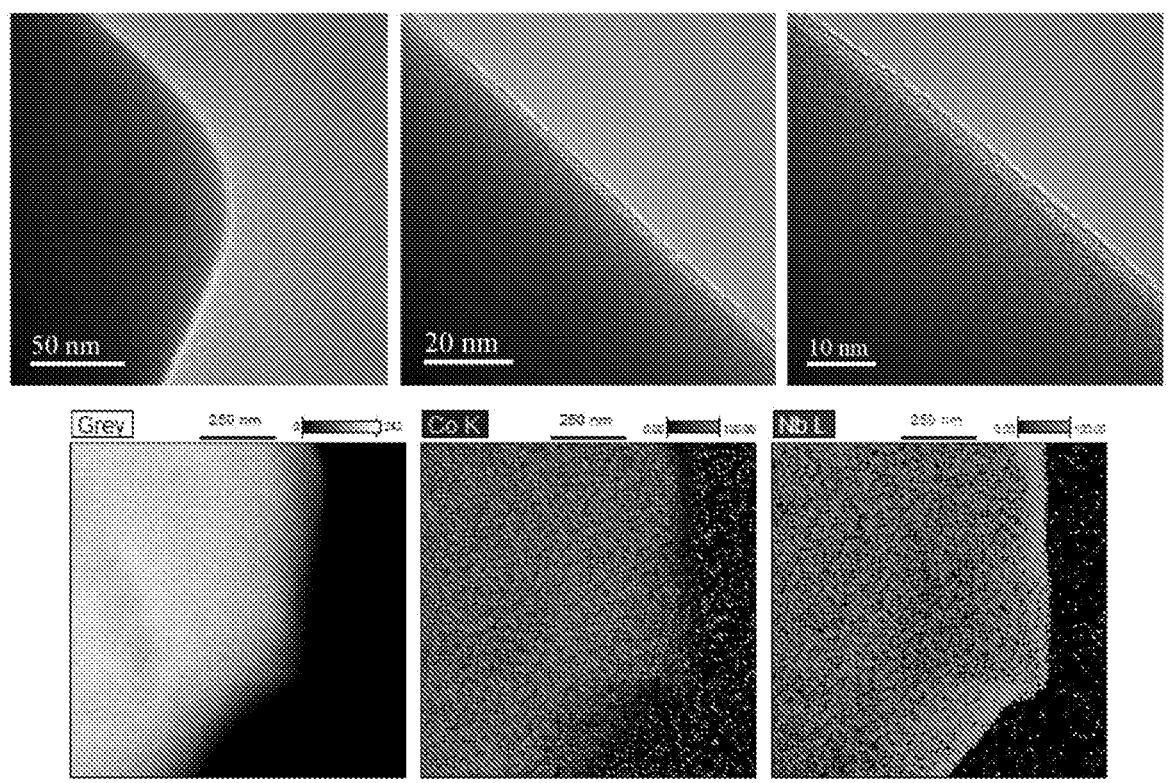

[FIG. 7]
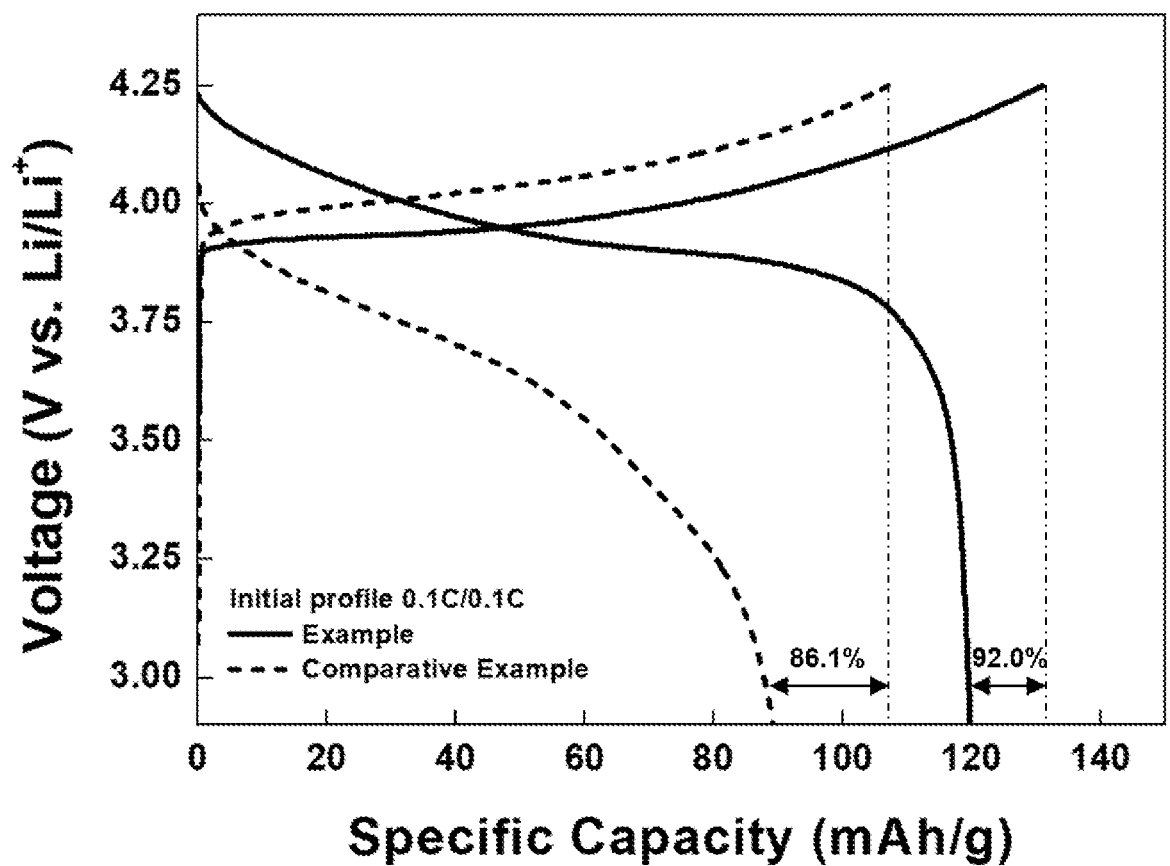

[FIG. 8]
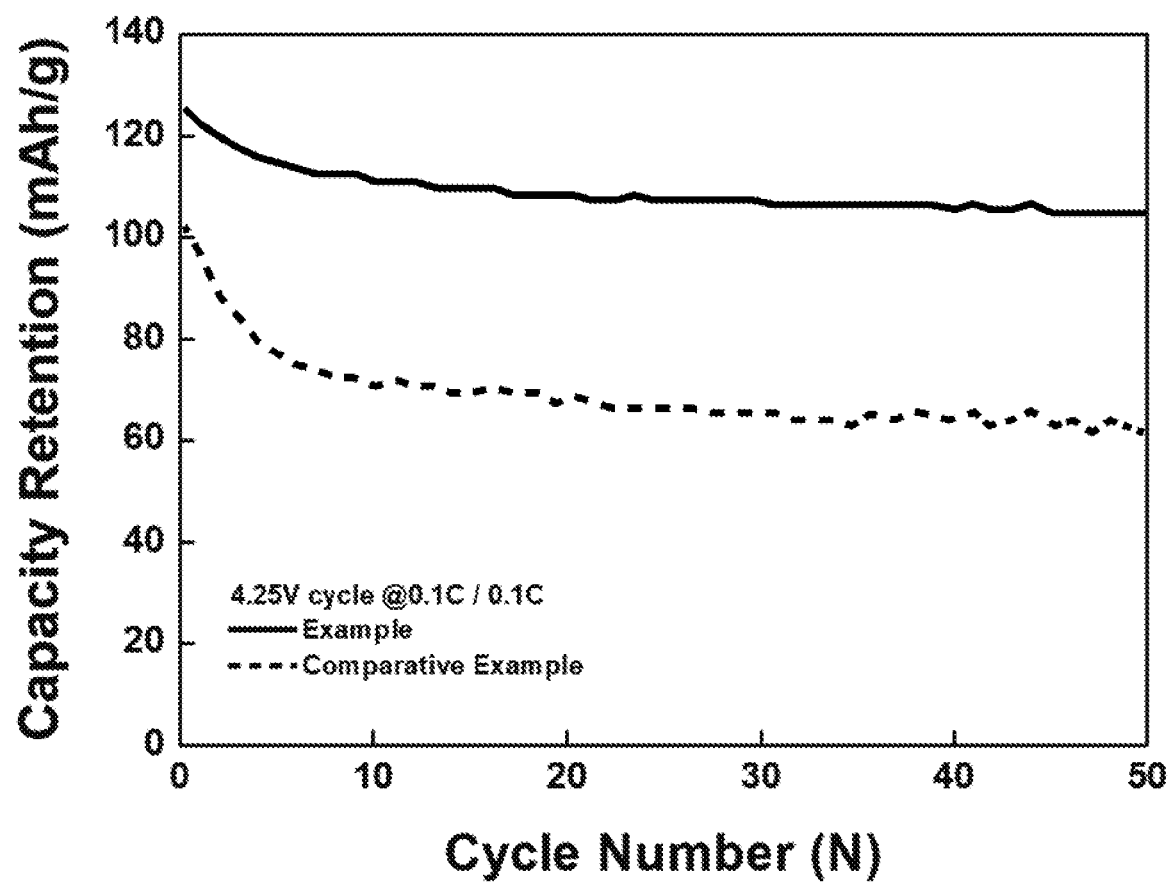

[FIG. 9]
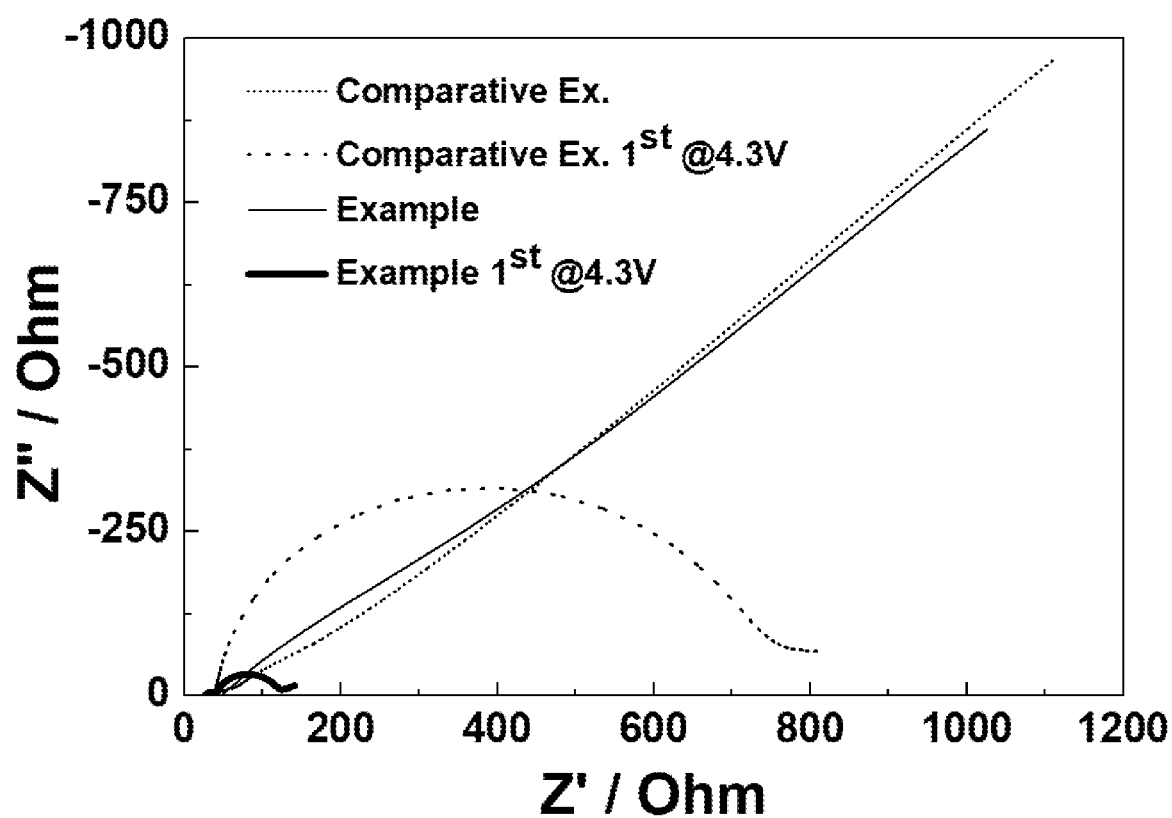

SULFIDE-BASED ALL-SOLID-STATE BATTERY INCLUDING POSITIVE ELECTRODE ACTIVE MATERIAL COATED WITH LITHIUM NIOBATE PRECURSOR AND METHOD OF MANUFACTURING THE SAME

TECHNICAL FIELD

The present invention relates to a sulfide-based all-solid-state battery including a positive electrode active material coated with a lithium niobate precursor and a method of manufacturing the same, and more particularly to a sulfide-based all-solid-state battery including a positive electrode active material coated with a lithium niobate precursor manufactured by a polyol process and a method of manufacturing the same.

BACKGROUND ART

A lithium ion secondary battery has advantages in that the lithium ion secondary battery has higher energy density, a lower self-discharge rate, and a longer lifespan than a nickel manganese battery or a nickel cadmium battery. However, the lithium ion secondary battery has disadvantages in that safety of the lithium ion secondary battery is reduced due to overheating thereof and the output of the lithium ion secondary battery is low.

In order to solve problems with the lithium ion secondary battery, an all-solid-state battery has been proposed as an alternative. The all-solid-state battery may be configured to have a structure in which a positive electrode layer including a solid electrolyte and a negative electrode layer are formed on opposite surfaces of an electrolyte layer including a solid electrolyte and a current collector is coupled to each electrode.

Based on the raw material of the solid electrolyte, the all-solid-state battery may be classified as an oxide-based all-solid-state battery, a polymer-based all-solid-state battery, or a sulfide-based all-solid-state battery. The sulfide-based all-solid-state battery has higher lithium ion conductivity than other all-solid-state batteries. However, the sulfide-based all-solid-state battery has disadvantages in that the sulfide-based all-solid-state battery has lower ion conductivity than conventional batteries using a liquid electrolyte and electric resistance between the positive electrode, the negative electrode, and the solid electrolyte is high, whereby the lifespan and output of the sulfide-based all-solid-state battery are low, which have not yet been overcome.

A positive electrode active material and a sulfide-based solid electrolyte react with each other at the interface therebetween, at which time a resistive material that impedes the operation of the all-solid-state battery is formed. The initial capacity and efficiency of the all-solid-state battery are reduced due to such a resistive material.

In a conventional all-solid-state battery, a positive electrode active material is coated with lithium niobate, whereby reactivity of the positive electrode active material with a sulfide-based solid electrolyte is reduced, and therefore performance of the all-solid-state battery is improved. In the case of Patent Document 1, a positive electrode active material is coated with lithium niobate in the state in which an organic solvent is used. Therefore, there is a problem in that the residual organic solvent must be completely evaporated so as not to react with a sulfide-based solid electrolyte before the solid electrolyte is used. In addition, lithium ethoxide and niobium ethoxide are used as a starting material in order to form the lithium niobate. As a result, there are problems in that production cost is high and process time is also lengthened.

In the case in which a positive electrode active material is coated with lithium niobate in a dry state, the lithium niobate is not uniformly coated on the positive electrode active material, whereby it is difficult to manufacture an inexpensive high-performance sulfide-based all-solid-state battery.

PRIOR ART DOCUMENT

Patent Document

Japanese Registered Patent No. 4982866

DISCLOSURE

Technical Problem

The present invention has been made in view of the above problems, and it is an object of the present invention to provide a sulfide-based all-solid-state battery manufactured using a stable and economical method of coating a positive electrode active material with a lithium niobate precursor manufactured by a polyol process.

Technical Solution

In accordance with an aspect of the present invention, the above and other objects can be accomplished by the provision of a positive electrode active material coated with a lithium niobate precursor manufactured by a polyol process. In addition, there is provided a sulfide-based all-solid-state battery including the coated positive electrode active material.

The coating may be mixing of the positive electrode active material and the lithium niobate precursor in a dry state without a separate solvent.

The coating may be mixing of the positive electrode active material and the lithium niobate precursor in the dry state and performing heat treatment using a method of increasing temperature to a target temperature at a rate of 5° C. per minute and decreasing the temperature through natural cooling.

The lithium niobate precursor may include lithium niobate and a chelating agent.

The chelating agent may be at least one selected from the group consisting of citric acid, polyvinylpyrrolidone (PVP), carboxylic acid, and a weak acid including a nitrogen element.

The lithium niobate precursor may be coated on the positive electrode active material in an amount of 1 nm to 100 nm.

The positive electrode active material may be lithium cobalt oxide. The lithium cobalt oxide may be used as a positive electrode active material according to an embodiment of the present invention, which may be used in a lithium ion secondary battery or an all-solid-state battery.

In accordance with another aspect of the present invention, there is provided a positive electrode active material coating method including S1) mixing a polyol and a chelating agent with each other to form a polyol precursor, S2) mixing the polyol precursor with lithium hydroxide and ammonium niobate oxalate hydrate to form a positive electrode active material coating material, and S3) coating a positive electrode active material with the positive electrode active material coating material.

Step S3) may be mixing the positive electrode active material coating material and the positive electrode active material with each other and heat-treating the mixture at 450° C. or higher for 2 hours.

Also, the heat treatment at 450° C. or higher for 2 hours may be performed using a method of increasing temperature to a target temperature at a rate of 5° C. per minute and decreasing the temperature through natural cooling.

Also, step S2) may be performed in a dry state.

In the present invention, one or more constructions that do not conflict with each other may be selected and combined from among the above constructions.

Effects of the Invention

The present invention provides a sulfide-based all-solid-state battery including a positive electrode active material having low reactivity with a sulfide-based solid electrolyte and having improved safety.

The positive electrode active material is uniformly coated with lithium niobate, whereby it is possible to provide a sulfide-based all-solid-state battery having low reactivity between the sulfide-based solid electrolyte and the positive electrode active material and having improved performance.

Furthermore, a coating method, which is conventionally performed in a wet state, is performed in a dry state, whereby it is possible to provide an economical manufacturing method having a simplified process.

BRIEF DESCRIPTION OF DRAWINGS

FIG. 1 is a flowchart showing a method of coating a positive electrode active material with a lithium niobate precursor according to the present invention.

FIG. 2 shows a chemical formula of a lithium niobate precursor manufactured by a polyol process.

FIG. 3 is a scanning electron microscopy (SEM) photograph of lithium niobate precursor manufactured by a polyol process according to the present invention.

FIG. 4 is a scanning electron microscopy (SEM) photograph of a positive electrode active material coated with the lithium niobate precursor manufactured by the polyol process according to the present invention.

FIG. 5 is a transmission electron microscopy (TEM) photograph of the lithium niobate precursor according to the present invention.

FIG. 6 is a transmission electron microscopy (TEM) photograph of a positive electrode active material coated with the lithium niobate precursor according to the present invention.

FIG. 7 is a graph showing a comparison in specific capacity based on voltage between a sulfide-based all-solid-state battery according to the present invention and a sulfide-based all-solid-state battery manufactured using an uncoated positive electrode active material.

FIG. 8 is a graph showing a comparison in capacity retention between the sulfide-based all-solid-state battery according to the present invention and the sulfide-based all-solid-state battery manufactured using the uncoated positive electrode active material.

FIG. 9 is a graph showing a comparison in impedance between the sulfide-based all-solid-state battery according to the present invention and the sulfide-based all-solid-state battery manufactured using the uncoated positive electrode active material.

DETAILED DESCRIPTION OF THE INVENTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description of embodying an element by defining or supplementing the element may be applied to all inventions unless there is a specific limitation, and does not define a specific invention.

Also, in the description of the invention of the present application and the claims, singular forms are intended to include plural forms unless mentioned otherwise.

Also, in the description of the invention of the present application and the claims, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Hereinafter, the present invention will be described in more detail.

The present invention may include a positive electrode active material coated with a lithium niobate precursor manufactured by a polyol process.

FIG. 1 is a flowchart showing a method of coating a positive electrode active material with a lithium niobate precursor according to the present invention. In FIG. 1, LCO denotes a positive electrode active material, and LNO coating layer denotes a lithium niobate precursor manufactured by a polyol process coated on the positive active material.

As can be seen from FIG. 1, a positive electrode active material according to the present invention is mixed with a lithium niobate precursor in a dry state without a separate solvent. The present invention is not limited as to a mixing method, and any known method may be used. Mixing may be performed through a conventional mechanochemical reaction. In addition, a conventional stirrer, mixer, planetary ball mill, or mortar mixer may be used at the time of mixing. In the case in which the planetary ball mill is used, the positive electrode active material may be mixed with the lithium niobate precursor under conditions of 50 to 500 revolutions/min, 0.1 to 10 hours, and 1 to 100 kWH/1 kg.

Although the moisture content of each particle is not limited as long as the particle is in a dry state, it is preferable that the particle be dried at 120° C. for 6 hours.

The weight ratio of the lithium niobate precursor to the positive electrode active material is not particularly restricted as long as the lithium niobate precursor is provided in an amount capable of coating the positive electrode active material. For example, the weight ratio of the lithium niobate precursor to the positive electrode active material may be 1 to 10:90 to 99, preferably 2 to 5:98 to 95.

After the positive electrode active material is mixed with the lithium niobate precursor in the dry state, the mixture may be heat-treated at 400° C. or higher. As the result of the heat treatment, the force of combination between the lithium niobate precursor and the positive electrode active material is increased, whereby the lithium niobate precursor coated on the positive electrode active material is brought into tight contact with the positive electrode active material.

The heat treatment may be performed using a method of increasing temperature to a target temperature at a rate of 5° C. per minute and decreasing temperature through natural cooling. At this time, it is preferable that the target temperature not exceed 500° C. In the case in which heat of 500° C. or higher is applied, cobalt from lithium cobalt oxide used as the positive electrode active material may spread to the lithium niobate precursor and thus may react with a sulfide-based solid electrolyte due to high temperature.

After arrival at the target temperature, the lithium niobate precursor and the positive electrode active material may be left alone for 1 to 3 hours until the lithium niobate precursor and the positive electrode active material are naturally cooled to 25° C.

The heat treatment is performed in a single process. The reason for this is that it is necessary to achieve uniform and regular combination between the lithium niobate precursor and the positive electrode active material and to prevent empty space from being formed between the lithium niobate precursor and the positive electrode active material.

After the heat treatment, the lithium niobate precursor may be coated on the positive electrode active material. The lithium niobate precursor may be coated on the positive electrode active material in an amount of 1 nm to 100 nm.

Polyol used in the polyol process generally designates a variety of alcohols containing two or more hydroxyl groups or amine groups in each molecule. In addition, the polyol according to the present invention may be a material obtained by reacting an initiator having two or more hydroxyl groups or amine groups, i.e. an initiator, such as multifunctional alcohol or aromatic amine, with propylene oxide or ethylene oxide.

The polyol may be generally classified as a polyether polyol or a polyester polyol, and it is preferable that the polyether polyol, rather than the polyester polyol, which has low resistance to heat and moisture, be used as the polyol according to the present invention.

The polyol process designates a fine powder manufacturing method of dissolving a salt, hydroxide, or inorganic compound oxide precursor in alcohol to form a reducible metal ion and heating a solution to an appropriate temperature to induce a reduction reaction of the metal ion in the solution.

Since the polyol solvent used at this time makes a difference in reducing power and interactivity with the metal ion depending on the kind thereof, the polyol solvent exerts an influence on setting of an appropriate synthesis temperature and the size and shape of a synthesized particle thereafter, and also changes a generated particle into a hydroxide or an oxide depending on circumstances.

The lithium niobate precursor is subjected to the following four steps through the polyol process:
a) reduction of a metal ion to a metal atom;
b) nuclear aggregation of metal atoms;
c) growth of a nucleus into a metal nanoparticle; and
d) stabilization of the metal nanoparticle using a stabilizer.

In an initial step, a metal salt, which is a precursor material, is dissolved in a liquid polyol, the dissolved salt is reduced by the polyol, and nanoparticles are generated from a solution through generation and growth of a nucleus of a metal particle. Subsequently, the metal nanoparticle is stabilized by a stabilizer.

The lithium niobate precursor formed by the polyol process has a size of 100 nm or less. The lithium niobate precursor, which has a nanoparticle size as described above, is formed as a high-concentration colloid, the sizes of particles are uniform by the polyol process, the extent to which the particles are dispersed is excellent, and no separate reductant is necessary.

FIG. 2 shows a chemical formula of the lithium niobate precursor formed by the polyol process. The lithium niobate precursor shown in FIG. 2 may be formed by mixing lithium hydroxide and ammonium niobate oxalate hydrate with each other. In the case of conventional lithium niobate, lithium ethylate and niobium ethylate, the unit cost of which is high, are used. Since the lithium niobate precursor according to the present invention is formed by the polyol process, however, lithium niobate may be formed of lithium hydroxide and ammonium niobate oxalate hydrate, the unit cost of which is lower than lithium ethylate and niobium ethylate.

Lithium hydroxide and ammonium niobate oxalate hydrate may be mixed with each other to obtain lithium niobate, and the lithium niobate may be mixed with a chelating agent to perform the polyol process of the lithium niobate precursor. The chelating agent may be at least one selected from the group consisting of citric acid, polyvinylpyrrolidone (PVP), carboxylic acid, and a weak acid including a nitrogen element. The chelating agent may be included so as to account for 1 to 10 parts by weight based on 100 parts by weight of lithium niobate.

The positive electrode active material according to the present invention may be a sulfur-carbon composite positive electrode active material including a porous carbon material, a compound having impregnation with electrolytic solution, and sulfur, and at least one of the inner surface or the outer surface of the porous carbon material may be sulfur-carbon composite including a coating layer including a compound having impregnation with electrolytic solution.

For example, the positive electrode active material may be made of a layered compound, such as lithium nickel oxide ($LiNiO_2$), or a compound substituted with one or more transition metals thereof; lithium manganese oxide represented by the chemical formula $Li_{1+x}Mn_{2-x}O_4$ (where x=0 to 0.33) or lithium manganese oxide, such as $LiMnO_3$, $LiMn_2O_3$, or $LiMnO_2$; lithium copper oxide ($Li_2CuO_2$); vanadium oxide, such as $LiV_3O_8$, $LiV_3O_4$, $V_2O_5$, or $Cu_2V_2O_7$; Ni-sited lithium nickel oxide represented by the chemical formula $LiNi_{1-x}M_xO_2$ (where M=Co, Mn, Al, Cu, Fe, Mg, B, or Ga, and x=0.01 to 0.3); lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or a mixture of $Fe_2(MoO_4)_3$, NCM622, and one or all thereof. In addition, known materials may be included. Thereamong, it is preferable to use lithium cobalt oxide, which has high energy density, is inexpensive, and is the best.

In addition, the average particle size of the positive electrode active material may be 1 nm to 30 µm, although the present invention is not limited as to the average particle size of the positive electrode active material.

The solid electrolyte according to the present invention is a sulfide-based solid electrolyte, which includes a sulfide-based particle. The surface of the sulfide-based particle may be coated or refined, and a sulfide-based solid electrolyte is manufactured through a dry and wet process using a mixture including the particle.

In the present invention, the sulfide-based particle is not particularly restricted, and all known sulfide-based materials used in the field of lithium batteries are possible. A commercial product or a material manufactured by crystallizing an amorphous sulfide-based material may be used as the sulfide-based material.

Typically, $Li_6PS_5Cl$ (LPSCl), thio-LISICON ($Li_{3.25}Ge_{0.25}P_{0.75}S_4$), $Li_2S$—$P_2S_5$—$LiCl$, $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $Li_2S$—$P_2S_5$, $Li_3PS_4$, $Li_7P_3S_{11}$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $Li_{10}GeP_2S_{12}$, $Li_{9.54}Si_{1.74}P_{1.44}S_{11.7}Cl_{0.3}$, and $Li_7P_3S_{11}$ are included.

A conductive agent according to the present invention is a carbon-based conductive agent, and is not particularly restricted as long as the conductive agent exhibits high conductivity without inducing any chemical change in a battery to which the conductive agent is applied. For example, the conductive agent may be at least one selected from the group consisting of graphite, such as natural graphite or artificial graphite; carbon black, such as carbon black, acetylene black, Ketjen black, channel black, furnace black, lamp black, or thermal black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; and a conductive material, such as a polyphenylene derivative.

A binder according to the present invention is not particularly restricted, and a known binder may be used. The binder may be any one selected from the group consisting of N,N-bis[3-(triethoxysilyl)propyl]urea, polyethylene oxide (PEO), poly(vinylidene fluoride) (PVDF), and poly(vinylidene fluoride-co-hexafluoropropylene) (PVDF-co-HFP) or a mixture of two or more thereof, or may be any one selected from the group consisting of N,N-bis[3-(triethoxysilyl)propyl]urea, polyethylene oxide (PEO), poly(vinylidene fluoride) (PVDF), poly(vinylidene fluoride-co-hexafluoropropylene) (PVDF-co-HFP), conjugated diene-based rubber latex, such as acrylonitrile-based styrene butadiene rubber (SBR), acrylonitrile butadiene rubber (NBR), methyl methacrylate butadiene styrene (MBR), or butadiene rubber (BR), carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers or a mixture of two or more thereof.

A method of manufacturing a sulfide-based all-solid-state battery according to the present invention includes S1) a step of mixing a polyol and a chelating agent with each other to form a polyol precursor, S2) a step of mixing the polyol precursor with lithium hydroxide and ammonium niobate oxalate hydrate to form a positive electrode active material coating material, and S3) a step of coating a positive electrode active material with the positive electrode active material coating material.

In step S1), the chelating agent may not be added.

In step S2), mixing may be performed using a dry type method without a separate solvent. The dry type mixing method has been mentioned above.

In step S3), the positive electrode active material coating material and the positive electrode active material may be mixed with each other, and the mixture may be heat-treated at 450° C. for 2 hours.

The heat treatment may be performed using a method of increasing temperature from 25° C., which is room temperature, to a target temperature at a rate of 5° C. per minute and decreasing temperature to 25° C. through natural cooling.

FIG. 3 is a scanning electron microscopy (SEM) photograph of the lithium niobate precursor manufactured by the polyol process according to the present invention, and FIG. 4 is a scanning electron microscopy (SEM) photograph of the positive electrode active material coated with the lithium niobate precursor manufactured by the polyol process according to the present invention. As can be seen from FIGS. 3 and 4, the positive electrode active material was uniformly coated with the lithium niobate precursor manufactured by the polyol process according to the present invention. In the case in which the positive electrode active material is uniformly coated with the lithium niobate precursor, as described above, it is possible to prevent the positive electrode active material from reacting with the sulfide-based solid electrolyte, whereby it is possible to improve performance of the sulfide-based all-solid-state battery. In addition, since the positive electrode active material of the sulfide-based all-solid-state battery is coated in a dry state, it is possible to reduce a concern of the sulfide-based solid electrolyte reacting with moisture, whereby it is possible to improve safety and to shorten the process.

This can be understood in more detail through FIGS. 5 and 6.

FIG. 5 is a transmission electron microscopy (TEM) photograph of the lithium niobate precursor according to the present invention, and FIG. 6 is a transmission electron microscopy (TEM) photograph of the positive electrode active material coated with the lithium niobate precursor according to the present invention.

As can be seen from FIG. 5, the lithium niobate precursor according to the present invention may have a uniformly distributed shape through the polyol process.

In FIG. 5, Grey, CK, NbL, and OK indicate Li, C, Nb, and O, respectively, and it can be seen from FIG. 5 that the lithium niobate reacted with the polyol and thus the respective elements were uniformly distributed in the precursor.

In addition, it can be seen from FIG. 6 that the uniformly distributed lithium niobate precursor (NbL) was coated on the uniformly distributed positive electrode active material (CoK), whereby the positive electrode active material did not react with the sulfide-based solid electrolyte.

In addition, the present invention provides a battery pack including the sulfide-based all-solid-state battery as a unit battery and a device including the battery pack as a power source. Specifically, the battery pack may be used as a power source for a device requiring the ability to withstand high temperature, a long lifespan, high rate characteristics, etc. Preferred examples of the device may include a mobile electronic device, a wearable electronic device, a power tool driven by a battery-powered motor, an electric vehicle (EV), a hybrid electric vehicle (HEV), a plug-in hybrid electric vehicle (PHEV), and a power storage apparatus. However, the present invention is not limited thereto.

The structure and manufacturing method of the device are well known in the art to which the present invention pertains, and thus a detailed description thereof will be omitted from this specification.

FIGS. 7 to 9 show comparisons in specific capacity based on voltage, capacity retention, and impedance between a sulfide-based all-solid-state battery according to the present invention as Example and a battery manufactured without synthesis of a lithium niobate precursor and a positive electrode active material, unlike the present invention, as Comparative Example, respectively.

In the case of the sulfide-based all-solid-state battery used as Example, 1) 8.6456 mg of citric acid was put into 100 ml of triethylene glycol (TEG) and mixing thereof was performed for 20 minutes, 2) the mixture was mixed with 0.4616 mg of lithium hydroxide and 3.0298 mg of ammonium niobate (V) oxalate hydrate at room temperature and synthesis thereof was performed at 230° C. for 3 hours, and 3) the synthesized product was gradually cooled down, was separated using a centrifuge, was washed using ethanol 7 or 8 times, and was dried in a vacuum oven at 50° C. to 200° C. to form a positive electrode active material coating material. 4) A positive electrode active material, $LiCoO_2$, was coated with the positive electrode active material coating material. At the time of coating, temperature was increased from room temperature at a rate of 5° C. while the positive electrode active material coating material and the positive electrode active material were mixed with each other using a stirrer, and when the temperature reached 450° C., the temperature was maintained for 3 hours in the state in which the temperature was not increased any more. 5) After 3 hours, the positive electrode active material coating material and the positive electrode active material were gradually cooled down to room temperature to obtain a coated positive electrode active material.

6) Subsequently, the coated positive electrode active material was mixed with carbon black, as a conductive agent, and polyvinylidene fluoride, as a binder, and the mixture was applied to aluminum, as a positive electrode current collector. 7) The electrode slurry was uniformly distributed on the current collector using a doctor blade, and was dried in a vacuum oven at 50° C. to 200° C. to form a positive electrode. The positive electrode, a solid electrolyte layer formed using an LPS-based electrolyte, as a sulfide-based solid electrolyte, and a negative electrode using copper as a current collector were stacked to form a unit cell.

In the case of the sulfide-based all-solid-state battery used as Comparative Example, a unit cell was formed using the same method as Example except that a positive electrode active material not coated with a positive electrode active material coating material was used.

FIG. 7 is a graph showing a comparison in specific capacity based on voltage between the sulfide-based all-solid-state battery according to the present invention and the sulfide-based all-solid-state battery manufactured using the uncoated positive electrode active material. At this time, the unit cells were charged under conditions of (CC/CV): 0.1 C/4.15V, 0.02 C cut-off, and rest 30 min, and were discharged under conditions of (CC): 0.1 C and 3V cut off. The specific capacity was calculated based on weight including a positive electrode material of the positive electrode and a gas diffusion layer.

It can be seen from FIG. 7 that, in the case of Example, an oxygen reduction curve corresponding to a first cycle was 132 mAh/g and an oxygen release curve was 120 mAh/g, and therefore there was a difference of about 92.0%. In contrast, the oxygen reduction curve of Comparative Example was 108 mAh/g and the oxygen release curve of Comparative Example was 92 mAh/g, and therefore there was a difference of about 86.1% in initial charge and discharge characteristics. Consequently, it can be seen that the charge and discharge characteristics of Example are excellent.

FIG. 8 is a graph showing a comparison in capacity retention between the sulfide-based all-solid-state battery according to the present invention and the sulfide-based all-solid-state battery manufactured using the uncoated positive electrode active material.

Referring to FIG. 8, charging was performed under conditions of (CC/CV): 0.1 C/4.25 V, 0.02 C cut-off, and rest 30 min, and discharging was performed under conditions of (CC): 0.1 C and 3V cut off. Charging and discharging were performed 50 times.

It can be seen from FIG. 8 that, in the case of the sulfide-based all-solid-state battery according to Example of the present invention, initial capacity was higher and capacity retention was better than Comparative Example.

FIG. 9 is a graph showing a comparison in impedance between the sulfide-based all-solid-state battery according to the present invention and the sulfide-based all-solid-state battery manufactured using the uncoated positive electrode active material.

Referring to FIG. 9, the unit cells were stored at 60° C. for 2 weeks in a fully charged state and were then disassembled from a glove box, and alternating current (AC) impedance of each of the unit cells was measured.

It can be seen from FIG. 9 that, in the case of the unit cell according to Example, the value of interface impedance between the positive electrode and the solid electrolyte was lower than in the case of Comparative example.

Consequently, it can be seen that, in the case in which a positive electrode active material is coated with a lithium niobate precursor manufactured by a polyol process in a dry state, as in the present invention, performance of a sulfide-based all-solid-state battery is better than in the case in which the positive electrode active material is not coated with the lithium niobate precursor.

Although the present invention has been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

The invention claimed is:

1. A method of coating a positive electrode active material, comprising:
   S1) mixing a polyol and a chelating agent with each other to form a polyol precursor;
   S2) mixing the polyol precursor with lithium hydroxide and ammonium niobate oxalate hydrate to form a positive electrode active material coating material in a dry state;
   S3) mixing the positive electrode active material coating material and a positive electrode active material with each other at a temperature to form a mixture, increasing the temperature to a target temperature of 450° C. to 500° C., heat-treating the mixture at the target temperature for 2 to 3 hours to obtain a coated positive electrode active material, and S4) cooling the coated positive electrode active material to room temperature, wherein the polyol is a polyether polyol or a polyester polyol, and the chelating agent is citric acid, polyvinylpyrrolidone (PVP), carboxylic acid, or a weak acid including a nitrogen element.

2. The method of coating a positive electrode active material according to claim 1, wherein in step S3), the temperature is increased at a rate of 5° C. per minute to the target temperature, and in step S4), the cooling of the coated positive electrode active material to the room temperature is performed through natural cooling.

\* \* \* \* \*